UNITED STATES PATENT OFFICE 2,237,284

PREPARATION OF STYRENE OXIDE AND DERIVATIVES THEREOF

Francis N. Alquist, Midland, Mich., and Cyrus O. Guss, Wolford, N. Dak., assignors to The Dow Chemical Company, Midland, Mich., a corporation of Michigan No Drawing. Application July 19, 1939,
Serial No. 285,350

4 Claims. (Cl. 260—348)

This invention relates to an improved method of preparing styrene oxide and derivatives thereof, and to certain new compounds prepared thereby.

A number of processes for the synthesis of styrene oxide, i. e. phenyl ethylene oxide, have been described in the art. Unfortunately these processes either require the use of expensive or unstable reagents, such as benzoyl hydroperoxide, alkali hypochlorites, and the like, or else involve chlorination steps in which the yield of product is low. For these reasons the price of styrene oxide has been excessive, and the compound has never met with the commercial acceptance which its unusual properties would seem to dictate.

We have now found that styrene oxide may be simply and cheaply prepared in high yield by brominating styrene in aqueous emulsion and then treating the crude brominated product with an alkaline agent. The reactions involved include reacting styrene with bromine water to form styrene bromhydrin and subsequently dehydrobrominating the latter without isolating it from the crude mixture. The reactions may be formulated as follows:

$$C_6H_5CH=CH_2 + Br_2 + H_2O = C_6H_5CHOHCH_2Br + HBr$$

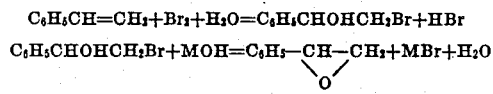

wherein MOH represents any suitable base.

In carrying out the bromination step we prefer to use approximately equimolecular proportions of styrene and bromine, and a considerable excess of water, e. g. 15–40 mols of water per mol of styrene. The styrene and water are agitated together to form a uniform dispersion or emulsion and the bromine is then added gradually over a period of 3–9 hours. When addition of bromine is complete, agitation is discontinued. The crude styrene bromhydrin product then settles out as an oily layer on the bottom of the reactor and is withdrawn. The supernatant aqueous layer may be discarded or treated to recover the hydrogen bromide therein. The bromination step just described is carried out most satisfactorily at temperatures in the range of 90–100° C., although higher reaction temperatures may sometimes be employed. The use of lower temperatures, e. g. 80° C. or less has the disadvantage that the ultimate yield of styrene oxide is materially reduced.

The styrene bromhydrin product formed during bromination is treated directly with aqueous alkali to form styrene oxide. Any alkali may satisfactorily be used, e. g. alkali metal hydroxides, such as sodium and potassium hydroxides, alkali metal carbonates, alkaline earth metal oxides, such as lime, organic bases, such as tetramethyl ammonium hydroxide, etc. The base is preferably used in a quantity equivalent to the styrene initially reacted in the bromination step, and is dissolved in an excess of water, e. g. 3–15 mols of water per mol of base. In practice, the alkali is dissolved in the water and the solution so formed is added with agitation during 3–40 minutes to the crude bromhydrin maintained at a temperature of 40°–75° C. The styrene oxide forms rapidly and rises to the top of the reaction mixture as an oily layer. This layer may be withdrawn and fractionally distilled at reduced pressure or otherwise treated to recover the styrene oxide in substantially pure form. In the dehydrobromination step just described, the time and temperature of reaction and the order of mixing the reactants are not critical, but are preferably held within the approximate limits stated. In particular higher temperatures and longer reaction times seriously reduce the yield of styrene oxide.

Although the foregoing description has been limited to the preparation of styrene oxide itself, it is to be understood that our new method is also applicable to the preparation of other styrene oxides, in which the phenyl nucleus is substituted with a halogen, or a lower alkyl, or lower alkoxy radical, from the corresponding vinyl aromatic compounds. Thus, according to the invention, p-ethyl styrene may be converted to p-ethyl styrene oxide, p-chlorostyrene into p-chlorostyrene oxide, dimethyl vinyl benzene to dimethyl styrene oxide, o-methoxy styrene to o-methoxy styrene oxide, etc. These nuclear substituted styrene oxides are, for the most part, high-boiling liquids useful as solvents, intermediates, etc. They have not been prepared by known methods applicable to making styrene oxide.

The following examples are illustrative of our invention, but are not to be construed as limitative.

Example 1

A mixture of 520 grams (5 mols) of styrene and 2500 cc. (139 mols) of water was heated at a temperature of 90° C., and 800 grams (5 mols) of bromine was added with agitation during 5 hours. At the end of this time the agitation was stopped and the mixture allowed to stand for a few minutes. A crude styrene bromhydrin layer settled to the bottom of the reactor and was withdrawn. This material, weighing 975 grams, was heated to a temperature of about 60° C. and a solution of 200 grams (5 mols) of sodium hydroxide in 1000 cc. of water was added with agitation during 5 minutes. Agitation was then stopped and the mixture permitted to stand for several minutes to allow the crude styrene oxide to rise as a supernatant oily layer. This crude product was removed and fractionally distilled at an absolute pressure of 0.6 inch of mercury, the fraction distilling at temperatures between 85° C. and 90° C. being collected. In this way 440 grams of styrene oxide were obtained, a quantity corresponding to a yield of 73.3 per cent of the theoretical based on the styrene initially employed.

*Example 2*

A mixture of 185 grams (1.4 mols) of technical ethyl vinyl benzene (a mixture containing about 75 per cent para-ethyl vinyl benzene and 25 per cent ortho-ethyl vinyl benzene) and 700 cc. of water was heated at a temperature of 90° C. and 224 grams (1.4 mols) of bromine was added with agitation during 3.5 hours. Agitation was continued for 0.5 hour more, and the mixture was then allowed to separate into two layers. The crude ethyl styrene bromhydrin layer, weighing 326 grams, was withdrawn. This material was then heated to a temperature of 70° C. and a solution of 58 grams of sodium hydroxide in 290 cc. of water was added with rapid agitation during 30 minutes. Agitation was then stopped and the crude ethyl styrene oxide layer was allowed to separate. This crude product was withdrawn and fractionally distilled at an absolute pressure of 0.3 inch of mercury, the fraction distilling at temperatures between 90° C. and 94° C. being collected. In this way there was obtained 133 grams of a mixture of ortho- and para-ethyl styrene oxides, a colorless liquid having a refractive index of 1.526 and a specific gravity of 1.016 at 25°/25° C. The yield corresponded to 64.4 per cent of theoretical.

*Example 3*

A mixture of 423 grams of a technical mixture of ortho- and para-chlorostyrenes and 1200 cc. of water was heated at a temperature of 90°–100° C. and 385 grams of bromine was added with stirring during 6.0 hours. Agitation was continued for 0.5 hour more, after which the mixture was allowed to separate into two layers. The crude chlorostyrene bromhydrin layer, weighing 695 grams, was withdrawn, heated to a temperature of 70° C., and stirred together with a solution of 104 grams of sodium hydroxide in 500 cc. of water during 0.5 hour. The resulting mixture was then cooled and allowed to separate into layers. The crude chlorostyrene oxide layer was withdrawn and fractionally distilled at an absolute pressure of 0.3 inch of mercury, the fraction distilling at temperatures between 93° C. and 95° C. being collected. There was obtained 116 grams of a mixture of ortho- and para-chlorostyrene oxides, a sweet-smelling oil having a refractive index of 1.551 and a specific gravity of 1.235 at 25°/25° C.

The terms "a styrene oxide" and "styrene oxides" as herein employed refer both to styrene oxide itself and to those derivatives of styrene oxide in which the phenyl nucleus has been substituted by halogen, a lower alkyl, or lower alkoxy radical. All such compounds may be prepared according to the process of the invention.

Other modes of applying the principle of our invention may be employed, change being made as regards the details hereinbefore disclosed, provided the steps recited by any of the following claims, or the equivalent of such stated steps be employed.

We claim:

1. The method of preparing styrene oxide which comprises reacting approximately equimolecular proportions of styrene and bromine in the presence of a considerable excess of water at a temperature of 90°–100° C. to form styrene bromhydrin, treating the bromhydrin thus formed at a temperature of 40°–75° C. with an aqueous alkaline solution containing alkali in a quantity approximately equivalent to the styrene initially employed, whereby styrene oxide is formed, and recovering the styrene oxide.

2. The method of preparing styrene oxide which comprises forming an emulsion of styrene in a considerable excess of water, agitating said emulsion at a temperature of 90°–100° C., and gradually adding thereto during 3 to 9 hours a quantity of bromine equivalent to the styrene employed, whereby styrene bromhydrin is formed, withdrawing the bromhydrin thus formed, agitating the same at a temperature of 40°–75° C. and adding thereto during 3 to 40 minutes an aqueous alkaline solution containing alkali in a quantity approximately equivalent to the styrene initially employed, whereby crude styrene oxide is formed, and recovering styrene oxide from such crude product by fractional distillation at reduced pressure.

3. As a new product, a mixture of ortho- and para-ethyl styrene oxides, a colorless liquid having a boiling point of about 90° to 94° C. at 0.3 inch of mercury absolute pressure, and a specific gravity of about 1.016.

4. The method of preparing a styrene oxide which comprises reacting approximately equimolecular proportions of bromine and a compound selected from the class consisting of styrene and those styrene derivatives in which the phenyl nucleus of styrene has been substituted with a substituent selected from the class consisting of halogens, lower alkyl and lower alkoxy radicals, in the presence of a considerable excess of water at a temperature of 90°–100° C., to form a bromhydrin, treating the bromhydrin thus formed at a temperature of 40°–75° C. with an aqueous alkaline solution containing alkali in a quantity approximately equivalent to the styrene compound initially employed, whereby a styrene oxide is formed, and recovering such styrene oxide.

FRANCIS N. ALQUIST.
CYRUS O. GUSS.